United States Patent [19]
Sato et al.

[11] Patent Number: 5,658,681
[45] Date of Patent: Aug. 19, 1997

[54] FUEL CELL POWER GENERATION SYSTEM

[75] Inventors: Mitsuru Sato; Koichi Shiraishi, both of Hokkai-do, Japan

[73] Assignees: Kabushikikaisha Equos Research; Aisin AW Co., Ltd., both of Japan

[21] Appl. No.: 534,583

[22] Filed: Sep. 27, 1995

[30] Foreign Application Priority Data

Sep. 30, 1994 [JP] Japan .................. 6-259763

[51] Int. Cl.$^6$ .................. H01M 8/04; H01M 8/10
[52] U.S. Cl. .................. 429/13; 429/22; 429/24; 429/30; 429/40
[58] Field of Search .................. 429/13, 17, 20, 429/22, 21, 24, 30, 33, 40

[56] References Cited

U.S. PATENT DOCUMENTS

| | | | |
|---|---|---|---|
| 3,982,962 | 9/1976 | Bloomfield | 429/20 |
| 4,046,956 | 9/1977 | Fanciullo | 429/20 |
| 4,081,693 | 3/1978 | Stone | 307/66 |
| 4,657,829 | 4/1987 | McElroy et al. | 429/19 |
| 4,729,930 | 3/1988 | Beal et al. | 429/13 |
| 5,100,744 | 3/1992 | Harashima | 429/22 |
| 5,366,821 | 11/1994 | Merritt et al. | 429/21 |
| 5,458,857 | 10/1995 | Collins et al. | 422/198 |
| 5,518,705 | 5/1996 | Buswell et al. | 429/13 |
| 5,527,632 | 6/1996 | Gardner | 429/21 |

FOREIGN PATENT DOCUMENTS 3-276573  12/1991  Japan .

*Primary Examiner*—Prince Willis, Jr.
*Assistant Examiner*—Carol Chaney
*Attorney, Agent, or Firm*—Lorusso & Loud

[57] ABSTRACT

A fuel cell power generation system including a reforming reactor for reacting a fuel with water to produce a hydrogen-rich reformed gas including carbon monoxide; a CO shift reactor for carrying out a CO shift reaction to decrease the concentration of carbon monoxide in the reformed gas; a CO removal reactor for oxidizing carbon monoxide in the reformed gas to carbon dioxide; and a fuel cell for generating electric power by reaction of the reformed gas with a gaseous oxidizing agent. Processors determine output required of the fuel cell and a proper space velocity for reformed gas entering the CO removal means, based on input values for the amount of the reformed gas fed to the CO removal means and the determined output required of the fuel cell.

15 Claims, 4 Drawing Sheets

FUEL CELL POWER GENERATION SYSTEM

BACKGROUND OF THE INVENTION

1. Field of the Invention

This invention relates to a fuel cell power generation system and, more particularly, to a solid-state polymer fuel cell power generation system for an electric vehicle.

2. Description of the Related Art

From the viewpoint of environmental concerns, electric vehicles are preferred because they are driven by clean electric power.

Fuel cells employing hydrogen gas and oxygen gas as fuel have been used as a source of electric power for driving electric vehicles; however, since a fuel cell alone cannot provide a sufficient driving range, a hybrid electric power unit has been developed combining a fuel cell, having large energy capacity and small output capacity, and a rechargeable battery having small energy capacity and large output capacity.

Such a hybrid electric power unit is disclosed in Japanese Patent Application Laid-open No. Hei 3-276573. This prior art system inputs a signal indicative of degree of accelerator opening through a potentiometer to an operation system, determines in the operating system an amount of fuel gas to be fed to the fuel cell based on a load command corresponding to the degree of accelerator opening, and controls the feed of fuel gas according to that determination. As a result, by changing the amount of the fuel gas fed to the fuel cell in response to the change of the driving load, the output of the fuel cell can be changed within, for example, a range of 3 kW, whereby the vehicle receives drive power corresponding to the degree of accelerator opening.

In the above-described conventional system, since the hydrogen gas supplied from a hydrogen cylinder is used as the fuel gas, it has been required that the hydrogen cylinder be carried in the vehicle, along with the electric power unit, with the result that the total weight of the vehicle is increased and maintenance involving changing the cylinders becomes complex. Furthermore, since oxygen gas is used as an oxidizing agent, there exists the danger of explosion in the vehicle.

When a fuel cell generation system is applied to an electric vehicle, it is advisable that the fuel cell generation system be structured to use a hydrocarbon type liquid fuel instead of a hydrogen cylinder, to produce a hydrogen-rich reformed gas by steam reformation reaction of the hydrocarbon type liquid fuel and to feed the reformed gas to the hydrogen electrode in the fuel cell. It is most desirable that a solid-state polymer fuel cell having good energy efficiency and small size be used as the fuel cell.

However, the working temperature of a solid-state polymer fuel cell is almost 100° C., and in the low-temperature region, the electrode core catalyst (Pt) becomes poisoned by carbon monoxide in the reformed gas, with the result that the performance of the fuel cell becomes unstable and short-lived. As a possible solution, the carbon monoxide concentration of about 1% included in the reformed gas just after the reformation reaction could be decreased to less than 100 ppm, more preferably less than 10 ppm, before the reformed gas is fed to the hydrogen electrode.

Conventionally, the reformed gas undergoes a two-step CO removal process, in which the reformed gas is first subjected to a CO shift reaction ($CO+H_2O \rightarrow H_2+CO_2$) by a shifting catalyst so as to decrease the carbon monoxide concentration to about 1,000 ppm, and the thus treated gas is then passed through a CO remover for CO removal ($CO+\frac{1}{2}O_2 \rightarrow CO_2$) by a selective-oxidation catalyst ($Pt/Al_2O_3$), so as to decrease the carbon monoxide concentration to 100 ppm or less.

In the above-described conventional system, only the fuel gas feed rate is controlled responsive to changes of load on the vehicle, so that the space velocity in the CO remover deviates from the desired range and, therefore, it is difficult to satisfactorily decrease the carbon monoxide concentration in the reformed gas.

SUMMARY OF THE INVENTION

It is an object of the present invention to solve the above-mentioned disadvantages of the conventional systems and to provide a fuel cell generation system having a reformer as a fuel gas producer wherein the hydrogen electrode in the fuel cell is fed a reformed gas having a carbon monoxide concentration less than 10 ppm by maintaining a proper space velocity in the reformed gas fed to a CO remover, even as the load on the vehicle changes.

The present invention attains the above-mentioned object by providing a fuel cell generation system including: raw materials storage; a reforming reactor for carrying out a reforming reaction to reform the raw materials into a hydrogen-rich gas including carbon monoxide; a CO shift reactor for carrying out a CO shift reaction to decrease the concentration of carbon monoxide in the reformed gas; a CO removal reactor for oxidizing carbon monoxide in the reformed gas to carbon dioxide; a fuel cell for generating electric power using, as fuel, a gaseous oxidizing agent and the reformed gas having been subjected to the shift reaction and the oxidation reaction; power determination means for determining a value for output required of the fuel cell; and space velocity determination means for determining space velocity to the CO removal reactor based on input values for the amount of reformed gas fed to the CO removal reactor and the determined output required of the fuel cell.

The preferred reactants for the reforming reaction are methanol and water.

The reforming reaction utilizes a reforming catalyst and should be maintained at a catalytically active temperature of 250° C. to 300° C.

The CO shift reactor contains a shift catalyst bed for reducing the carbon monoxide concentration in the reformed gas to 1,000 ppm at a catalytically active temperature of 150° C. to 200° C.

The CO removal reactor includes plural reaction zones separated by partition plates formed of gas impermeable and heat conductive materials. Each reaction zone includes a chamber containing a selective-oxidizing catalyst and a cooling chamber for maintaining the selective-oxidizing catalyst within a predetermined temperature range. The selective-oxidizing catalyst chamber may be formed with a L-shaped cross-section. The temperature of the selective-oxidizing catalyst is preferably maintained within a catalytically active range of 90° C. to 140° C.

The selective-oxidizing catalyst is used as a static bed over which the reformed gas is passed. The density of the catalyst on its support is preferably significantly lower at the upstream side, relative to the flow of the reformed gas, than at the downstream side.

The above-mentioned selective-oxidation catalyst has an active temperature range of 90°–140° C., so that the reaction temperature in the catalytic CO remover should be maintained within this range. Experiments indicate that the space velocity SV should be 1,000–2,000 hr$^{-1}$ for the CO removal reaction. At a higher space velocity the carbon monoxide concentration included in the reformed gas becomes so excessive that the amount of non-reacting carbon monoxide remaining in the reformed gas increases to an unacceptable level. On the other hand, a lower space velocity promotes a side reaction ($H_2+CO_2 \rightarrow CO+H_2O$) between the hydrogen and carbon dioxide in the reformed gas whereby it becomes impossible to decrease the carbon monoxide concentration to a suitable value.

Valves are used to regulate the amount of the reformed gas flowing into the CO removal reactor. The respective valves are opened and closed independently to regulate the space velocity as detected by the space velocity determination means to be 1,000 hr$^{-1}$ to 2,000 hr$^{-1}$.

The carbon monoxide concentration in the reformed gas is reduced to 10 ppm or less by the CO shift reaction and the oxidation reaction.

DETAILED DESCRIPTION OF THE PREFERRED EMBODIMENT(S)

Figure 1:
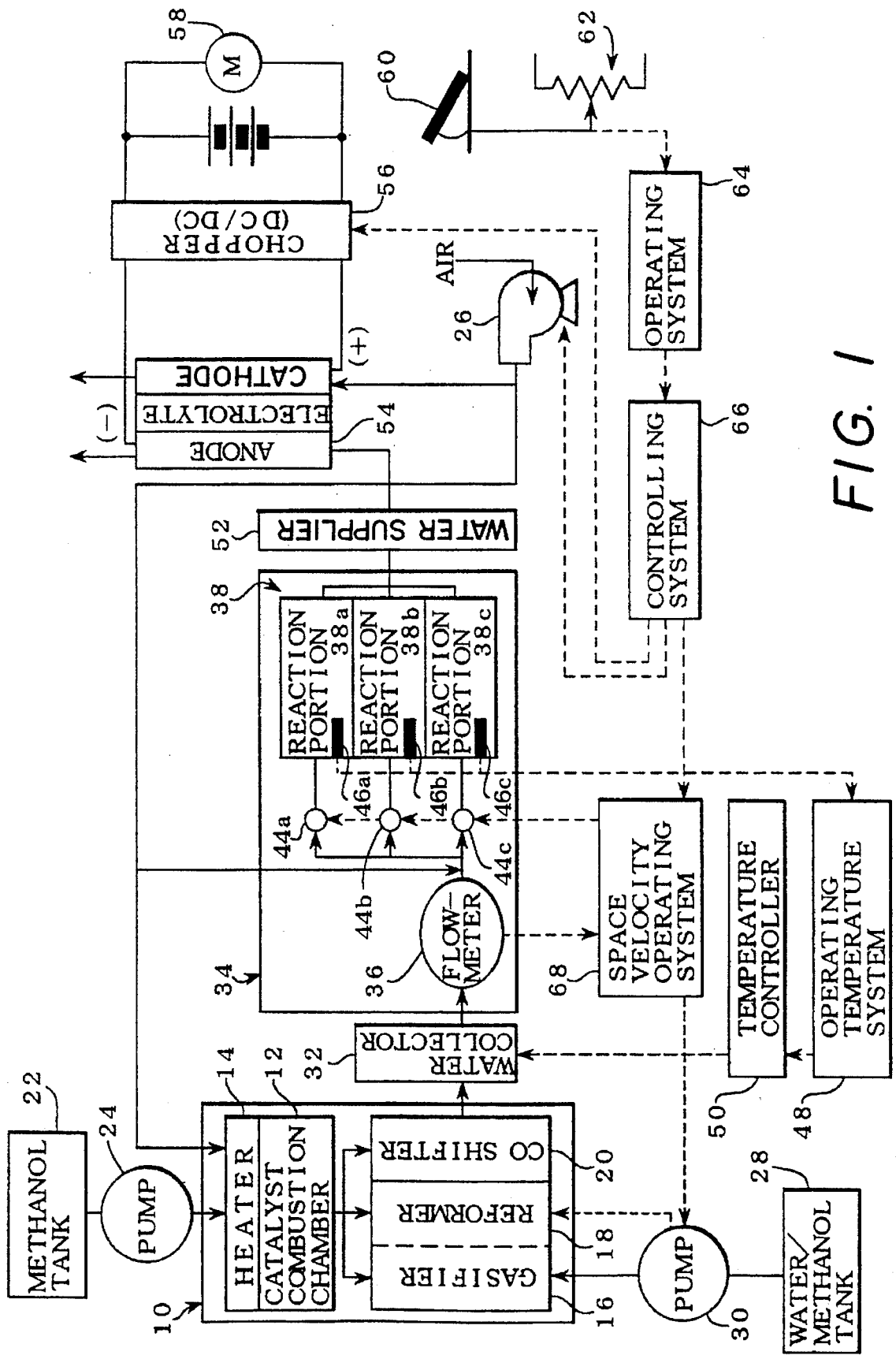
FIG. 1 is a block diagram of a preferred embodiment of a system including a solid-state polymer fuel cell for an electric vehicle according to the present invention.

FIG. 1 shows a preferred embodiment of a solid-state polymer fuel cell system for an electric vehicle according to the present invention wherein a catalytic combustion chamber 12 of a fuel-processing apparatus 10 simultaneously receives liquid methanol from a tank 22 through a pump 24 and air from an air blower 26. The liquid methanol is burned in the presence of a combustion catalyst to produce a heat-source gas. Since the catalytic combustion chamber 12 containing the combustion catalyst initiates combustion in this embodiment, a heater 14 is provided to heat the combustion catalyst to its activation temperature. However, the heat-source is not limited to the above, but may also be, for example, produced by combusting hydrogen gas or liquid methanol with air as a combustion assistant by means of a burner. The heat source gas can be used as a heat source for the gasification in gasifier 16, for the reformation reaction in reformer 18 and for the CO shift reaction in CO shift reactor 20, as explained later.

A liquid fuel mixture of water and methanol, as the reactant for the reforming reaction (mixing ratio 1:1–1:4), is stored in a tank 28 and is fed to the gasifier 16 of the fuel-processing apparatus 10 under pressure by means of a pump 30. The gasifier 16 is composed of a gasification section (not shown) and a heating section (not shown). The gasification section is heated by the heating section which, in turn, is heated by the heat-source gas received from the catalytic combustion chamber 12, whereby the liquid fuel is gasified in the gasifier 16 to form a reformer feed gas. The reformer feed gas reaction mixture, gasified in the gasifier 16, is fed over the reforming catalyst in the reformer 18 to form a hydrogen-rich reformed gas by undergoing a reformation reaction ($CH_3OH(g)+H_2O(g) \rightarrow 3H_2+CO_2$). The reformer 18 contains a reforming catalyst, for example a reforming catalyst consisting of Cu/Zn, formed on a support (carrier) by impregnation, spray deposition, electrodeposition, spattering, coating or similar technique. The reformer is maintained at 250°–300° C., i.e. within the active temperature range of the reforming catalyst, by the heat-source gas. The reformed gas produced by the catalytic reforming reaction is rich in hydrogen, but at the same time it includes excess steam, carbon dioxide and a small amount of carbon monoxide (about 1%).

The reformed gas produced by the reformation reaction is fed to a CO shift reactor 20 located next to the reformer 18, wherein the carbon monoxide included in the reformed gas is removed by a CO shift reaction ($CO+H_2O \rightarrow H_2+CO_2$), in the presence of a shifting catalyst, to cause the carbon monoxide concentration in the reformed gas to decrease to almost 1,000 ppm. The CO shifter 20 contains a heating section and a shift catalyst section. The shift catalyst includes at least one of Cu and Zn and is formed on a support by means of impregnation, spray deposition, electrodeposition, spattering, coating or the like. The active temperature for the CO shift reaction is 150°–200° C. and the above-mentioned heat-source gas from the catalytic combustion chamber is used as a heat source in the CO shifter.

Figure 4:
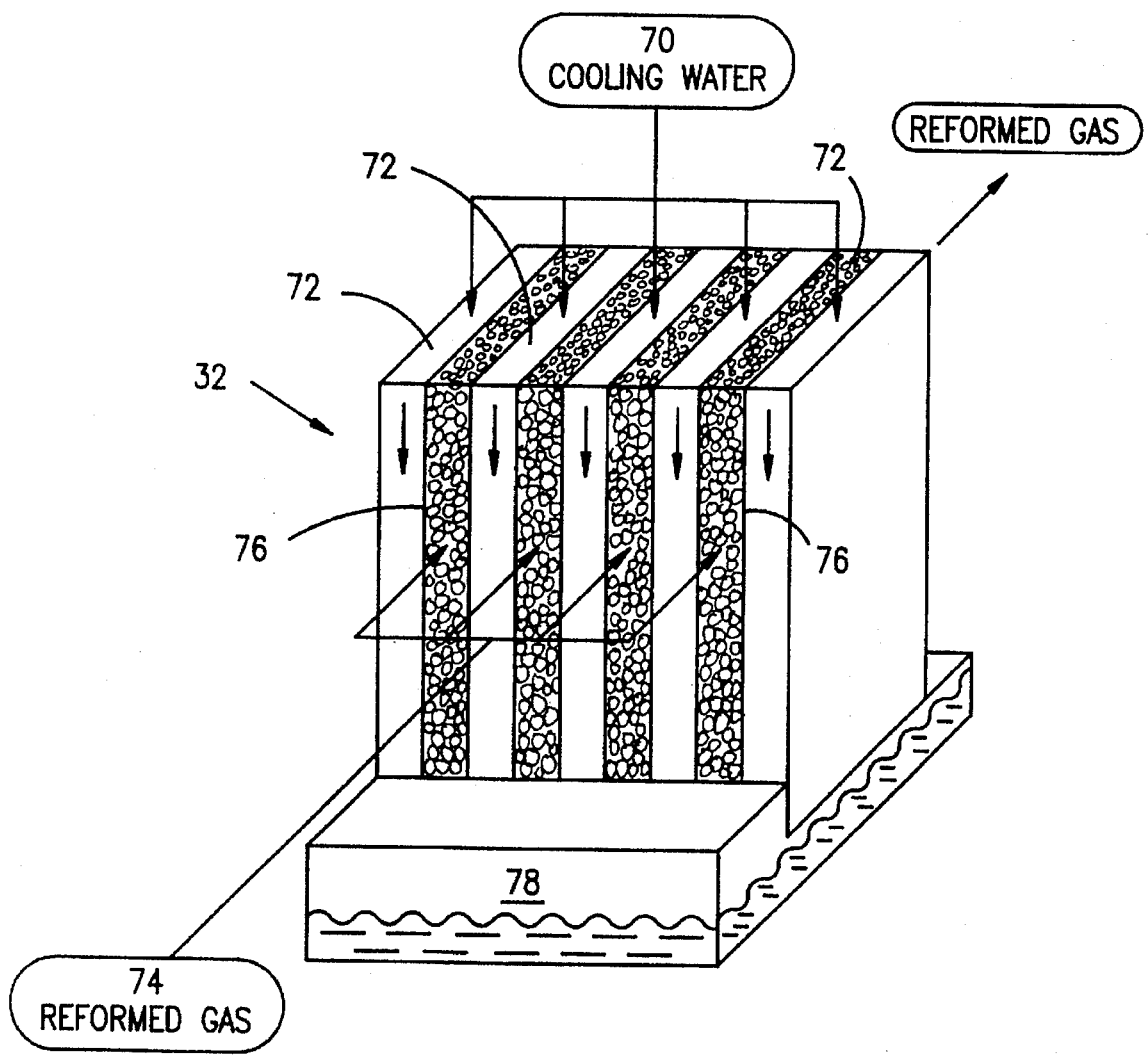
FIG. 4 is a perspective view of the water cooler of the embodiment of FIG. 1.

The reformed gas, after the CO shift reaction, is fed water collector 32. As shown in FIG. 4, the water collector 32 is divided into alternating water collecting sections 16, each of which receives a portion of the reformed gas from feed header 74, and cooling sections 72, each of which receives cool water at below room temperature from water supply header 70. A water collection tank 78 is provided in the bottom of water collector 32 to collect the cooling water, from sections 72 and any condensate from sections 76, for recirculation. Each cooling section 72 communicates with water collection tank 78 through holes in a bottom plate (not shown). Each water collecting section 76 is filled with a hygroscopic material, such as particulate silica gel, so that excess water vapor included in the reformed gas is removed as the reformed gas passes through the water collecting sections 76. Simultaneously, the reformed gas is cooled by indirect heat exchange with the cooling water passing through cooling sections 72.

The reformed gas exiting the water collector 32, together with air from the air blower 26, is fed to a CO remover 34 wherein the reformed gas undergoes an oxidation reaction ($CO+\frac{1}{2} O_2 \rightarrow CO_2$) promoted by a selective-oxidizing catalyst ($Pt/Al_2O_3$) to eliminate carbon monoxide from the reformed gas.

Figure 2:
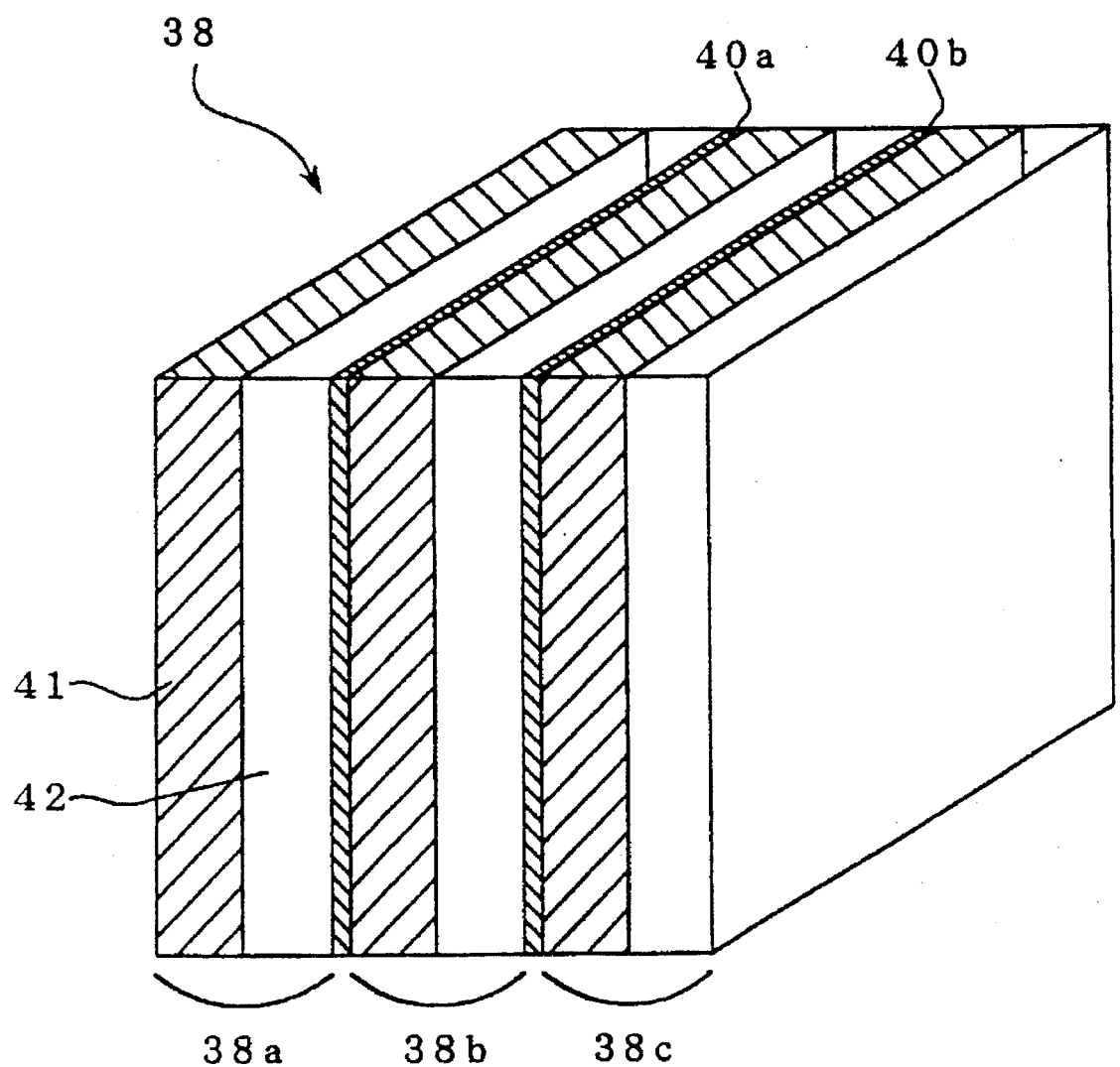
FIG. 2 is a perspective view of a first embodiment of a reaction zone of the CO removal reactor of FIG. 1.
Figure 3:
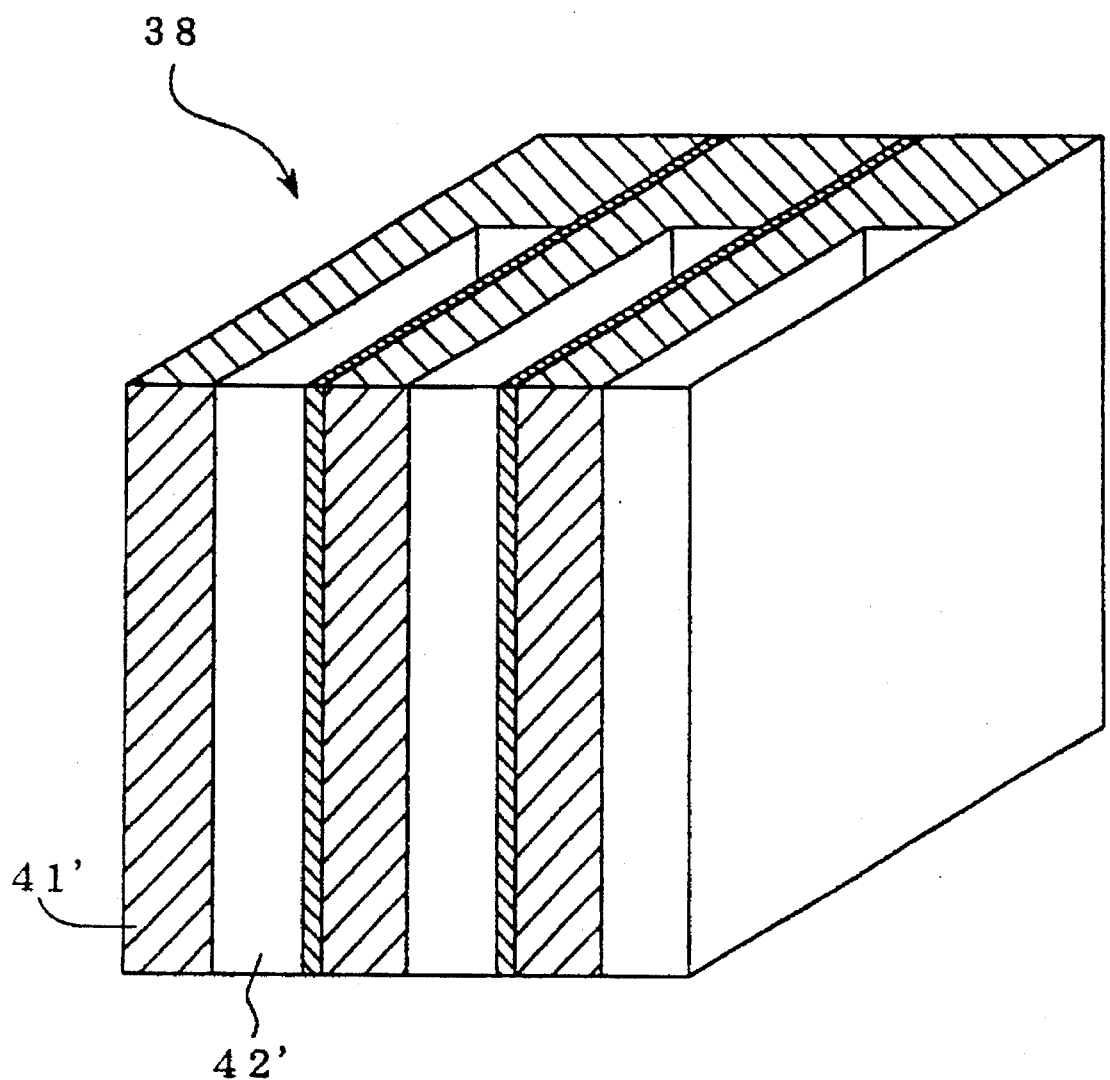
FIG. 3 is a perspective view of a second embodiment of a reaction zone of the CO removal reactor of FIG. 1.

A gas flow-meter 36 measures the flow of reformed gas into the CO remover 34. As shown in FIG. 2, a reaction zone 38 is divided into plural reaction chambers 38a–38b by partition plates 40a, 40b formed of a material having gas barrier and heat conducting properties (e.g., stainless steel). In each reaction chamber, a selective-oxidizing catalyst section 41, which receives the reformed gas, is paired with an adjacent cooling section 42 through which cooling water is circulated, so that the selective-oxidizing catalyst is maintained within an active temperature range of 90°–140° C. Cooling water is circulated both through the water collector 32 and the cooling sections 42 of the reaction zone of the CO remover 34. In the embodiment of FIG. 3, the catalyst section 41' is formed with a L-shaped cross-section in order to increase the relative amount of the catalyst carried in the catalyst section 41' and the cutaway portion 41' defines a cooling section 42'.

The selective-oxidizing catalyst is preferably a catalyst containing 0.1–50 wt. % Au (gold), more preferably 1–10 wt %. The $O_2/CO$ molar ratio is preferably 0.5–5, more preferably 1–3, and the temperature is about 100° C. The catalyst can be obtained by impregnating an acidic gold chloride aqueous solution into an oxide carrier consisting of at least one oxide selected from $Fe_2O_3$, CoO, NiO, $Al_2O_3$, $TiO_2$, $ZrO_2$ and $SiO_2$, and calcining after drying or by neutralizing an acidic solution of gold chloride and nitrate of the metallic element of the oxide with an alkali solution to form a coprecipitate, washing the coprecipitate with water, and calcining after drying. Alternatively, instead of the foregoing catalyst, a catalyst in the form of an oxide of Co, Mn, Fe or Pt supported on a carrier such as $Al_2O_3$ can be employed.

The above-mentioned catalyst contained in each of the catalyst sections 41 of the reaction zone 38 is formed on a support by means of impregnation, spray deposition, electrodeposition, spattering, coating, etc. A preferred selective oxidation catalyst is $Au/\alpha\text{-}Fe_2O_3$ supported on a carrier (support) in the form of glass beads or alumina beads, 2–3 mm in diameter.

The density of the selective oxidation catalyst in the catalyst sections 41 may be uniform throughout the bed; however, it is preferable that the upstream sides of the section beds, relative to the flow of the reformed gas, have a ratio of catalytically active material to particulate catalyst support (catalyst density) which is significantly lower than the downstream sides of the section beds. With such a catalyst density gradient, the cooling of the high-temperature reformed gas at the upstream side is facilitated, with the result that the increasing temperature caused by heat produced in the oxidation reaction is better controlled.

Temperature sensors 46a–46c are provided to continuously measure the temperature of the reformed gas fed into the reaction chambers 38a–38c, and the signal representing the detected temperature is sent to a system temperature calculator 48. The system temperature calculator 48 computes an average temperature value for the reformed gas, based on the individual signals of the plural temperature sensors, and sends the computed average value to a temperature controller 50. Therefore, for example, if it is detected that the average temperature of the reformed gas has increased to over 100° C., the temperature controller 50 lowers the temperature of the selective-oxidizing catalyst in the reaction zone 38 of the CO removal reactor 34 to within a range of active temperature between room temperature and 100° C. by control of water flow in the water collector 32.

Valves 44a–44c are disposed at the upstream side of the reaction sections 38a–38c of the CO remover 34, so that the reformed gas after passing through the flow meter 36, may be separately fed into one or plural reaction sections by selectively opening and closing valves 44a–44c, as will be described in more detail below, whereby carbon monoxide is removed from the reformed gas by an oxidation reaction promoted by the selective-oxidizing catalyst.

As described thus far, the carbon monoxide concentration in the reformed gas is first lowered to about 100 ppm and then further reduced to 10 ppm or less by subjection, in succession, to a CO shift reaction in the CO shifter 20 and to an oxidation reaction in the CO remover 34. The reformed gas is then fed through a humidifier 52 in the form of a water tank at constant temperature equipped with a heater. The humidified reformed gas is then fed to the hydrogen anode (−) of the solid-state polymer fuel cell 54. Since the reformed gas is cooled, as well as humidified, in the humidifier 52, the fuel cell is maintained at a temperature of between 50°–100° C., which is a suitable operating region, and in a moist state by reason of water content supplied to its electrolytic film.

As is well known, the solid-state polymer fuel cell 54 generates electric power by reacting the reformed gas fed to the hydrogen electrode (−) with a gaseous oxidizing agent, e.g. air, fed from the blower 26 to the oxygen electrode (+) within the medium of the solid-state polymer electrolytic film. The electrical output generated by solid-state polymer fuel cell 54 is fed through a chopper 56 to a motor 58 for driving a vehicle.

The degree of movement of an accelerator pedal 60 is converted into an electric signal by a potentiometer 62, which signal is input to a power output calculator. In the power output calculator 64, the output value for the fuel cell 54 is computed, based on the load command signal, as a function of the detected degree of throttle opening or position of the accelerator pedal. A system controller 66 controls both the amount of the reformed gas fed to the hydrogen electrode and the amount of air fed to the oxygen electrode in the fuel cell 54, and simultaneously controls the output from the chopper 56, based on the computed fuel cell output value. More specifically, the feed of air to the oxygen electrode is controlled by the air blower 26 and the feed of reformed gas to the hydrogen electrode is controlled so that the reformed gas is at a suitable space velocity upon contact with the selective-oxidizing catalyst in the reaction section 38 of the CO remover 34.

To control the feed of reformed gas, the output value of the fuel cell 54, based on the vehicle load command computed by the power output calculator 64, and a value for the total reformed gas flow at the time of that computation, are input to a space velocity calculator 68 which determines a feed rate of reformed gas which gives a space velocity SV of 1,000–2,000 $hr^{-1}$ preferred for the selective-oxidation reaction in the CO remover 34.

For example, when the reaction zone 38 having a total capacity of 4,000 $cm^3$ is divided into three reaction sections by the two partition plates 40a, 40b, the reaction sections 38a–38c each having a capacity of about 1,330 $cm^3$, computing the reaction capacity V ($cm^3$) from the fuel cell output value P (kW) and the reformed gas flow Q ($m^3/hr$) to give a suitable space velocity SV=1,500 $hr^{-1}$, gives the following result:

| P (kw) | Q ($m^3$/hr) | V ($cm^3$) |
| --- | --- | --- |
| 1 | 2 | 1,330 |
| 2 | 4 | 2,660 |
| 3 | 6 | 4,000 |

That is, when the fuel cell output value P is defined as 1 kW, if the calculated value of the reformed gas flow Q is 2 $m^3$/hr, since the proper reaction capacity is computed as 1,330 $m^3$, it is sufficient that the reformed gas be limited to feed only one reaction section (38a) and, accordingly, valve 44a is open while valves 46b and 46c are shut. On the other hand, when the fuel cell output value is defined as 2 kW, the reformed gas is fed to two reaction sections (38a, 38b) and when the fuel cell output value is defined as 3 kW, the reformed gas is fed to all reaction sections (38a, 38b, 38c).

Accordingly, after the reaction capacity is determined as described above, the valves 44a–44c provided at the inlets to the three reaction sections are controlled to either open or close to regulate the number of reaction sections receiving the reformed gas.

The space velocity determination means 68 controls the fuel feed rate provided by the pump 30 to provide the reformed gas flow Q required for a fuel cell output value P defined by the system controller 66. When the fuel feed rate is controlled as described above, the reformed gas flow Q, with the fuel feed rate control established, is measured at the flow-meter 36 and it is input to the space velocity calculator 68 which computes a suitable space velocity by the above-mentioned method, and the opening and closing of the valves is controlled to admit the reformed gas to a number of the reaction sections, which number is selected to most closely approximate the computed space velocity.

According to the present invention, the space velocity of the reformed gas fed to the CO remover is controlled and held within the predetermined region in response to the fuel cell output required for the driving load on the electric vehicle. Therefore, the CO removal reaction proceeds efficiently, facilitated by the action of the selective-oxidizing catalyst contained in the CO remover, and the reformed gas can be fed to the fuel cell with its carbon monoxide concentration decreased to below a predetermined level (e.g., 10 ppm), whereby the electrode core catalyst of the fuel cell is protected against degradation and the fuel cell achieves stable performance and long service life.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A fuel cell power generation system comprising:
    a reforming reactor for reacting fuel and water in a reforming reaction to produce a reformed gas containing hydrogen and carbon monoxide;
    CO shift reactor for subjecting said reformed gas to a CO shift reaction to decrease concentration of carbon monoxide in said reformed gas;
    CO removal means for oxidizing carbon monoxide in said reformed gas, exiting said CO shift reactor, to carbon dioxide;
    a fuel cell for generating electric power by reaction of a gaseous oxidizing agent and said reformed gas having been subjected to the shift reaction and the oxidizing reaction;
    power output determining means for determining an output power value required from said fuel cell to meet a load demand;
    space velocity determining means for determining a space velocity for feed of said reformed gas to said CO removal means, in accordance with the determined output value; and
    regulating means for regulating the feed of reformed gas to the CO removal means responsive to the determined space velocity.

2. The fuel cell power generation system according to claim 1, wherein said reforming reactor contains a supported reforming catalyst.

3. The fuel cell power generation system according to claim 1, wherein said CO removal means has plural reaction chambers separated by partition plates which are gas barriers and which are heat conductive.

4. The fuel cell power generation system according to claim 3, wherein said each reaction chamber is composed of a reaction section containing a selective-oxidizing catalyst and a cooling section for receiving cooling water to maintain the temperature of said selective-oxidizing catalyst within a predetermined temperature range.

5. The fuel cell power generation system according to claim 4, wherein said reaction section is L-shaped in cross-section.

6. The fuel cell power generation system according to claim 4, wherein said regulating means includes a plurality of valves, each valve opening or closing one reaction section whereby said regulating means regulates the number of reaction sections receiving the reformed gas.

7. A fuel cell power generating process comprising:
    reacting a fuel with water in gas phase in a reforming reaction to produce a reformed gas including carbon monoxide at a first concentration and hydrogen;
    feeding said reformed gas to a shift reactor for a CO shift reaction therein to decrease the concentration of carbon monoxide in said reformed gas to a second concentration lower than said first concentration;
    feeding said reformed gas to a CO reactor, having a plurality of sections, for an oxidation reaction therein to decrease the concentration of carbon monoxide in said reformed gas to a third concentration lower than said second concentration;
    feeding said reformed gas, containing carbon monoxide at said third concentration, and a gaseous oxidizing agent to a fuel cell for reaction to generate electric power;
    determining an output value for power required from said fuel cell as a function of a load demand;
    determining a space velocity value for said reformed gas entering said CO reactor based on input values for the feed rate of said reformed gas to said CO reactor and said determined output value; and
    controlling the number of said plurality of sections of said CO reactor receiving said reformed gas in accordance with the determined space velocity value.

8. The fuel cell power generating process according to claim 7, wherein said fuel is methanol.

9. The fuel cell power generating process according to claim 7, wherein said reforming reaction is promoted by a reforming catalyst and is conducted at a catalytic active temperature of 250° C. to 300° C.

10. The fuel cell power generation process according to claim 7, wherein said shift reactor contains a bed of a shift catalyst and wherein said shift reaction reduces the carbon monoxide first concentration in said reformed gas to a second concentration of 1,000 ppm or less at a temperature of 150° C. to 200° C.

11. The fuel cell power generating process according to claim 7, wherein each section of said CO reactor includes at least one reaction subsection containing a bed of selective-oxidizing catalyst and at least one cooling subsection and further comprising circulating water through said cooling subsection to maintain the temperature of said selective-oxidizing catalyst in a predetermined temperature range.

12. The fuel cell power generating process according to claim 11, wherein said predetermined temperature range is 90° C. to 140° C.

13. The fuel cell power generating process according to claim 11, wherein said selective-oxidizing catalyst is supported on a particulate carrier in a first density at the upstream side of said bed and a second density at the downstream side of said bed, relative to the flow of the reformed gas through said CO reactor, said second density being higher than said first density.

14. The fuel cell power generating process according to claim 7, wherein said space velocity is controlled at 1,000 $hr^{-1}$ to 2,000 $hr^{-1}$.

15. The fuel cell power generating process according to claim 7, wherein said third carbon monoxide concentration in said reformed gas is 10 ppm or less.

* * * * *